United States Patent [19]

Brown

[11] Patent Number: 4,478,593
[45] Date of Patent: Oct. 23, 1984

[54] COUPLING OF UNRELATED ENGINE AND TRANSMISSION

[76] Inventor: Gordon Brown, Champlain Dr., Greenville, S.C. 29611

[21] Appl. No.: 271,439

[22] Filed: Jun. 8, 1981

[51] Int. Cl.³ ............................ F16D 1/06; F02F 7/00
[52] U.S. Cl. .................................. 464/182; 74/606 R; 192/112
[58] Field of Search ................... 464/182, 901, 71, 93; 74/606 R; 192/112; 123/DIG. 6, DIG. 7, 195 A

[56] References Cited

U.S. PATENT DOCUMENTS

| | | | |
|---|---|---|---|
| 3,082,645 | 3/1963 | Chiarello | 74/606 R |
| 3,550,713 | 12/1970 | Swanson | 464/901 X |
| 4,121,532 | 10/1978 | Coryell | 464/182 X |
| 4,125,036 | 11/1978 | Nakamura et al. | 123/195 A X |
| 4,193,322 | 3/1980 | Morino et al. | 74/606 R X |

OTHER PUBLICATIONS

J.C. Whitney & Co., "Automotive Accessories and Parts", Catalog No. 234, 1966, pp. 66, 67, 68 and 71.

Primary Examiner—Stuart S. Levy
Assistant Examiner—Daniel P. Stodola
Attorney, Agent, or Firm—Bailey & Hardaway

[57] ABSTRACT

An internal combustion engine is coupled with an unrelated transmission utilizing a connector plate disposed between a powered flywheel related to the engine and a transmission flywheel which is related to the transmission assembly. An annular disc is utilized to connect a housing of the flywheel to a housing of the transmission assembly.

1 Claim, 6 Drawing Figures

COUPLING OF UNRELATED ENGINE AND TRANSMISSION

BACKGROUND OF THE INVENTION

This invention relates generally to the art of auto mechanics, and more particularly, to the art of coupling or joining engines and transmissions which were not originally designed for such joining.

It has frequently been found desirable to place an internal combustion engine into an automobile which did not include that engine type as original equipment. A number of considerations make such a conversion desirable. One such consideration comes about when the original engine has outlived its natural life and must be replaced in order to maintain the automobile in operating condition. Another consideration comes about when it is desired to replace an existing engine with a more economical engine. A third such consideration comes about when it is desired to replace an existing engine with an engine which is more powerful than the engine originally included within the automobile.

The introduction of an engine into an automobile which is not similar to the original engine always brings about the problem of coupling the engine to a foreign transmission. In the past there have generally been three ways to overcome or avoid this problem. The most direct way to circumvent this problem is to utilize an engine that will bolt directly to the transmission. This essentially means replacing the engine with a similar type engine.

Another technique for overcoming the problem of connecting an engine to a transmission is to replace the existing transmission as well as the engine whereby an engine transmission combination is installed into the automobile. This combination, having been designed for such a union obviates the problem of joining an engine to a foreign transmission for which it was not designed.

The third alternative in the prior art was to adapt a connection between the transmission and the engine. In the prior art this adaptation required intricate machining to mate the pilot shaft of the transmission assembly to the bushing normally located in the center of the engine fly wheel. Even with precise machining so as to mate a pilot shaft and bushing, the engine fly wheel becomes mated with a transmission assembly for which there was no original design work.

The connection of an engine to a foreign transmission additionally requires the fabrication of an adapter plate in order to attach the transmission housing to the flywheel housing of the engine. The function of the adapter plate is to permit attachment to the flywheel housing through threaded bolt holes normally provided therein and to provide a means of attachment to the transmission housing through threaded holes in alignment with bolt holes on the transmission housing.

SUMMARY OF THE INVENTION

It is thus an object of this invention to provide a method of coupling an engine to a foreign transmission which does not require intricate machining to mate the pilot shaft of the transmission assembly to an engine flywheel.

It is a further and more particular object of this invention to provide a component to permit the coupling of an engine to a foreign transmission.

It is a yet further object of this invention to provide a coupled engine and transmission wherein the engine and transmission are unrelated.

These as well as other objects are accomplished by a connector plate which is attached to a powered flywheel which is related to the engine, and then having attached thereto a transmission flywheel which is related to a transmission assembly associated therewith. An annular disc is utilized to connect the engine flywheel housing to the transmission housing.

DETAILED DESCRIPTION

In accordance with this invention, it has been found that an engine may be coupled with an unrelated transmission in a manner so as to have only two additional parts added in the coupling and not requiring modification of any of the parts associated with the engine or the transmission. The essence of this invention is the utilization of a connector plate which is adapted to attach to the powered flywheel related to the engine and to have attached thereto a transmission flywheel which is related to the transmission assembly. Appropriate housings are joined together utilizing an annular disc to adapt the housing connections. In order to aid in the following description, the following definitions are put forth:

Related parts within a motor vehicle are parts which were designed by a manufacturer to be assembled and marketed as a completed motor vehicle. Related parts include replacements for such assembled parts. Unrelated parts are parts which were not otherwise intended to be assembled into a motor vehicle for marketing as a completed vehicle.

An engine and transmission are thus related to one another if they were originally designed to be coupled into a completed motor vehicle for marketing at the retail level. An engine and transmission are related if they were designed to be replacements for such related parts.

A powered flywheel is a flywheel related to an engine and which is in communication with the crank shaft of that engine.

A transmission flywheel is a flywheel which is related to the transmission assembly with which it communicates.

A transmission assembly includes that part of the drive train of a motor vehicle which extends from the transmission flywheel to the drive shaft of the motor vehicle. A transmission assembly in the case of a manual shift transmission would thus begin with the clutch assembly which is attached to the transmission flywheel and extend to the drive shaft thereof. In the case of an automatic transmission, the transmission assembly would begin with the torque converter which is attached to the transmission flywheel and extends to the drive shaft of the motor vehicle.

The term "coupled" means joined or attached so as to produce an operable motion transmitting union. An engine coupled with an unrelated transmission assembly is attached so as to transmit motion from the engine to the transmission assembly for producing movement of a motor vehicle.

Figure 1:
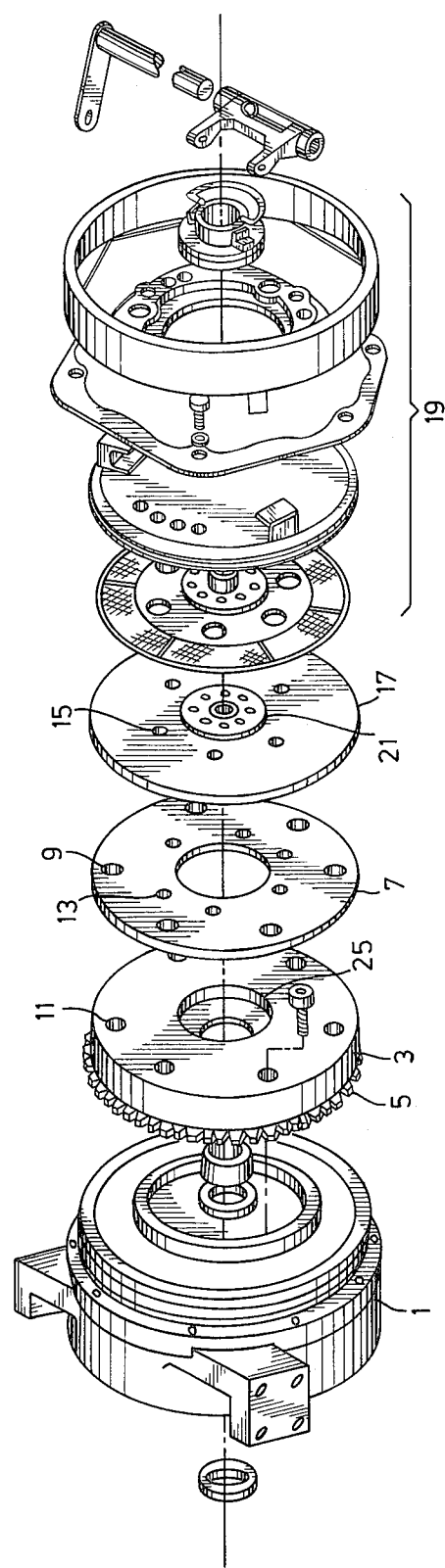
FIG. 1 is an exploded isometric view illustrating the sequence of attaching an unrelated engine and transmission in accordance with this invention.

FIG. 1 of the drawings represents an exploded view of the sequence of attaching portions of a drive train when an engine and transmission which are unrelated are joined together in accordance with this invention. FIG. 1 illustrates that portion of the drive train which extends from the crank shaft into the transmission assembly. FIG. 1 illustrates a portion of the transmission assembly of a manual shift transmission. In FIG. 1, the numeral 1 refers to a flywheel housing, which houses powered flywheel 3, having ring gear 5 thereon. Flywheel 3 is a powered flywheel related to the engine to which it is attached. The numeral 7 identifies the connector plate which is the essence of this invention. Connector plate 7 is adapted to be attached to powered flywheel 3 through bolt holes 9. Generally there are six such bolt holes which align with threaded holes 11 in powered flywheel 3. Connector plate 7 has threaded bolt holes 13 in alignment with bolt holes 15 on transmission flywheel 17. Bolt holes 15 are provided in most manufactured flywheels in order to provide versatility. Transmission flywheel 17 is related to transmission assembly 19 which connects thereto in a related manner. Generally transmission flywheel 17 has in the center thereof a pilot bearing 21 to communicate with a pilot shaft associated with the transmission assembly. In accordance with this invention, the transmission assembly is preferably bolted only to the transmission flywheel, but may be bolted through the transmission flywheel to the connector plate.

This invention contemplates that in some instances bolt holes 15 may not be provided in transmission flywheel 17 and in such an instance these bolt holes must be added.

Figure 2:
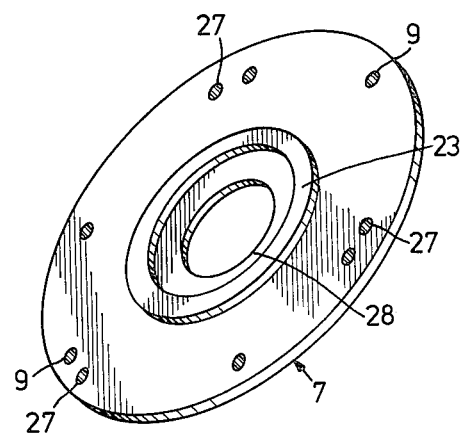
FIG. 2 is an isometric view of a connector plate in accordance with this invention.
Figure 3:
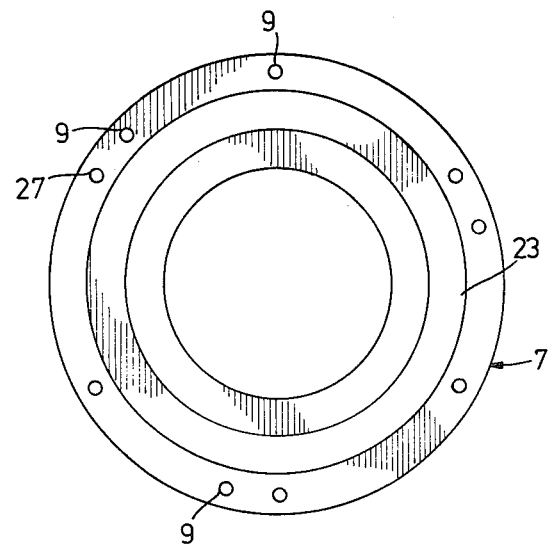
FIG. 3 is a frontal view of the connector plate of FIG. 2 as it would face a powered flywheel.
Figure 4:
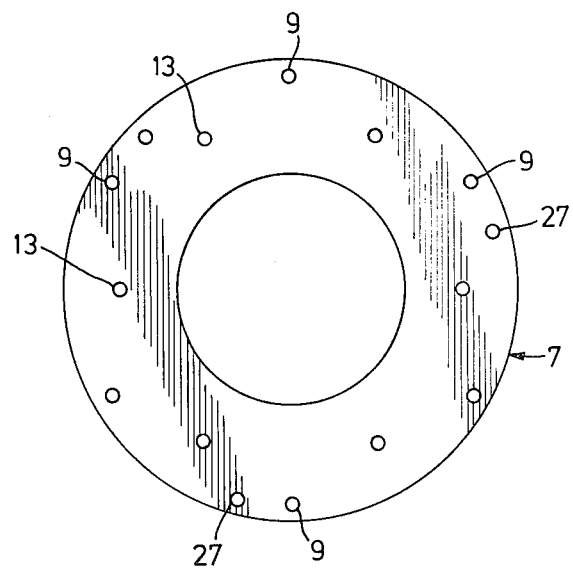
FIG. 4 is a rear view of the connector plate of FIG. 3.

A view of the connector plate in accordance with this invention is shown in FIGS. 2, 3 and 4 of the accompanying drawings. FIG. 2 of the drawings is an isometric view of the connector plate showing the side thereof which mates with the powered flywheel. As is seen in FIGS. 2 and 3, connector plate 7 has on the surface thereof facing the powered flywheel a circular protrusion 23 which is adapted to mate with depression 25 in powered flywheel 3. Preferably the tolerance fit between protrusion 23 and cavity 25 is plus or minus +0.0000 −0.0005 which necessitates the inclusion of threaded holes 27 to facilitate removal of the connector plate at such time as it is desired to remove the connector plate from powered flywheel 3. During normal use, the threaded holes 27 are not utilized or occupied by bolts. During disassembly from the flywheel 3, however, three bolts are threaded into threaded holes 27 and due to the pressure exerted on the flywheel 3 by the threaded bolts the connector plate 7 is disengaged from flywheel 3. FIG. 4 of the drawings illustrates the reverse view of the connector plate as illustrated in FIG. 3. The view in FIG. 4 faces the transmission flywheel and bolts thereto by threaded holes 13. Six such threaded holes are illustrated but it is understood that the number of threaded holes utilized will vary with the transmission flywheel to which the connector plate is attached.

The connector plate 7 defines in the center portion thereof an opening 28 which is for the purpose of reducing weight. Opening 28 is not an essential feature of the connector plate.

Figure 5:
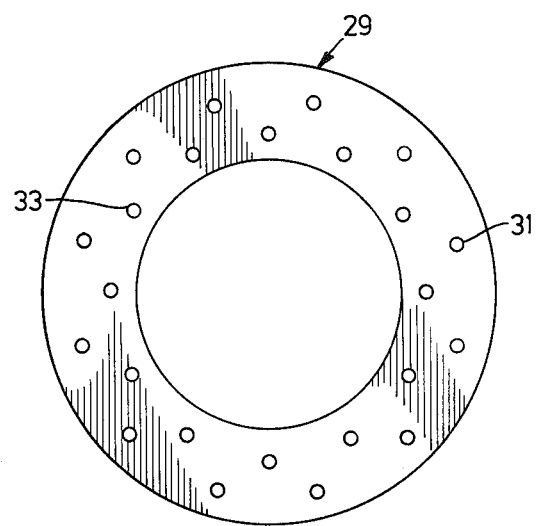
FIG. 5 is an annular disc in accordance with this invention for connecting a flywheel housing to an unrelated transmission housing.

FIG. 5 of the drawings illustrates an annular disc which adapts the flywheel housing of the engine to the housing of the transmission. Annular discs such as 29 are generally conventionally utilized when mating an unrelated engine and transmission. Generally the disc 29 is bolted to the flywheel housing, housing powered flywheel 3 by bolt holes 31. Bolt holes 31 are in alignment with the threaded holes of the flywheel housing. Twelve such bolt holes are illustrated in FIG. 5. Inner threaded bolt holes 33 are aligned with the bolt holes of the transmission housing and permit direct attachment to the transmission housing utilizing the bolts and bolt holes as if the housing were being attached to a related part. The thickness of annular disc 29 is carefully determined in order to permit the clutch or torque converter components of the transmission assembly to function in the manner for which originally intended. The thickness of the annular disc will to a large extent be related to the thickness of the connector plate 7. Once the thickness of the connector plate is determined the thickness of the annular disc is derived therefrom so as to permit the transmission assembly and its clutch component to function in its normally intended manner. Once the appropriate thicknesses are determined they may be changed in relation to one another. For example, if one quarter inch were added to the thickness of the connector plate, the annular disc would have be thickened by one quarter inch.

Figure 6:
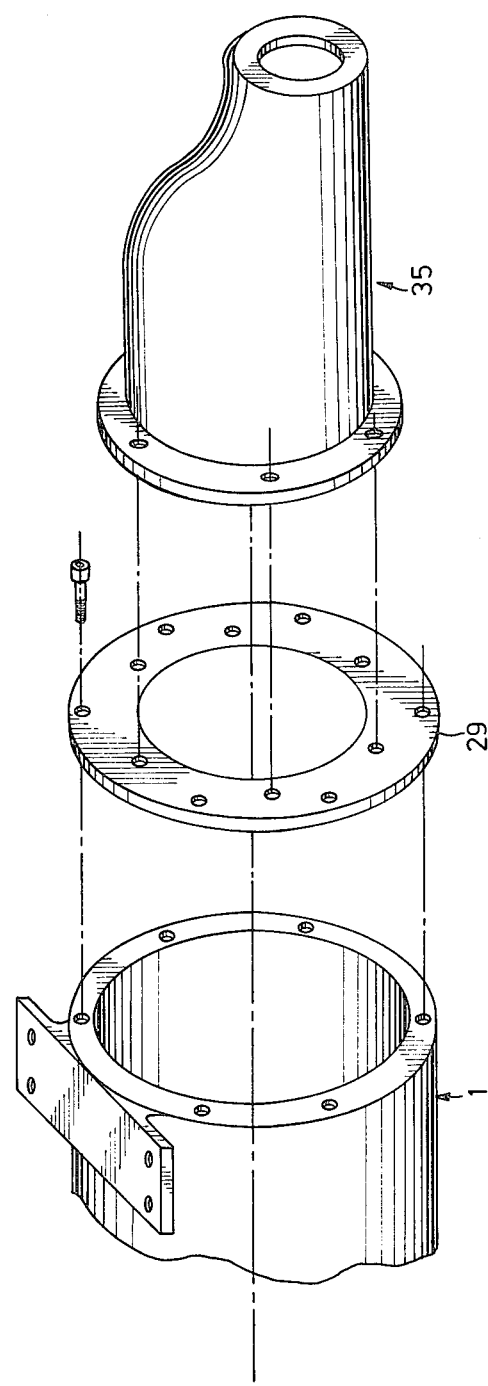
FIG. 6 is an exploded isometric view of an annular ring connecting housing assemblies.

FIG. 6 of the drawings illustrates the interposition of annular disc 29 between a flywheel housing 1 and a transmission housing 35. Frequently the front portion of such a transmission housing is referred to as the bell housing.

A preferred mode of utilizing this invention is to couple a diesel engine with an unrelated transmission so as to replace a conventional gasoline powered engine with a diesel engine. As an example, a Perkins 4-154 diesel engine was mounted in a 1965 Ford Mustang body with a Ford 5-speed transmission. A connector plate 10.75 two inches in diameter having six y(0.404) drill throughs with a ⅜ths inch counterbore 5/16ths of an inch deep was bolted to the powered flywheel of the Perkins engine utilizing six ⅜ by 1¼ NF socket head cap screws. A ¼ inch thick circular protrusion having a 9.5 inch outer diameter and 8.1 inner diameter mated with the central depression of the powered flywheel.

An annular disc having an outer diameter of 16 inches with an inner diameter of 11.5 inches and a thickness of 0.5 inches was attached to the flywheel housing of the powered flywheel with twelve ⅜ by 1¼ N.F. cap screws through 12 y(0.404) drill throughs equally spaced along a concentric circle at a 15 inch diameter along the annular disc.

A Ford flywheel part number D27Z6375A was attached to the connector plate utilizing six ⅜ by 1½ NF socket head cap screws. The attachment was into six Q(0.332) drill, 0.914 inch deep, tapped ⅜ of an inch 24 NF equally spaced along a circle having a diameter of 9.59 inches. The Ford clutch assembly was then attached to the Ford flywheel part utilizing parts related to the Ford transmission.

The connector plate and annular disc utilized within the scope of this invention may be constructed of those materials conventionally utilized within an automobile drive train, e.g., steel or aluminum plate. Such parts should be blanchard or ground on both surfaces prior to utilization.

It is thus seen that in accordance with this invention, a technique has been provided for coupling an engine to an unrelated transmission without modification of standard parts and utilizing only two additional parts to facilitate the coupling. A unique connector plate is provided by this invention which permits the coupling of a powered flywheel to a transmission flywheel. As many variations will be apparent to those of skill in the art from a reading of the above specification, such variations are included within the scope of this invention as is defined by the following appended claims.

That which is claimed is:

1. In a drive train within a motor vehicle having an internal combustion engine coupled to an unrelated transmission assembly by a connector plate;

said internal combustion engine comprising a powered flywheel having a ring gear attached thereon and a housing to house said powered flywheel;

said transmission assembly including a transmission flywheel, a pilot bearing disposed in the center of said transmission flywheel and a pilot shaft engaging said pilot bearing, wherein said transmission flywheel is attached to said transmission assembly through said pilot shaft;

a transmission housing related to and housing said transmission assembly;

an annular disc disposed between and attaching said engine housing and transmission housing, said annular disc being of a thickness so as to permit said transmission housing to operate in conjunction with said connector plate and said transmission assembly to operate as originally intended;

said powered flywheel and said transmission flywheel each having a plurality of circumferentially disposed holes, the holes of said powered flywheel being threaded;

said connector plate being generally circular and having first and second sets of circumferentially disposed holes, said first sets of holes being in alignment with the holes of said powered flywheel, said second set of holes being threaded and in alignment with the holes of said transmission flywheel, said connector plate further including a generally circular protrusion on the side thereof facing said powered flywheel for mating with a corresponding opening in said powered flywheel;

a first plurality of bolts extending through said first set of holes into threaded engagement with said powered flywheel holes for attaching said connector plate to said powered flywheel;

a second plurality of bolts extending through said transmission flywheel holes into threaded engagement with said second set of holes for attaching said connector plate to said transmission flywheel; and said connector plate having a third set of circumferentially spaced holes defining threaded openings therethrough for disengaging said connector plate from said powered flywheel when bolts are tightened through said third set of holes.

* * * * *